(12) United States Patent
Shimada

(10) Patent No.: US 6,392,623 B1
(45) Date of Patent: May 21, 2002

(54) METHOD FOR DRIVING ACTIVE MATRIX SUBSTRATE AND LIQUID CRYSTAL DISPLAY DEVICE USING THE SAME

(75) Inventor: Yoshinori Shimada, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/510,624

(22) Filed: Feb. 22, 2000

(30) Foreign Application Priority Data

Feb. 23, 1999 (JP) .......................................... 11-045492
Dec. 7, 1999 (JP) .......................................... 11-348217

(51) Int. Cl.$^7$ ................................................ G09G 3/18
(52) U.S. Cl. ............................. 345/92; 345/94; 349/47
(58) Field of Search ...................... 345/87–104, 204, 345/208–210; 349/42, 45, 47, 46

(56) References Cited

U.S. PATENT DOCUMENTS 5,500,537 A * 3/1996 Tsumura et al. .............. 257/40

FOREIGN PATENT DOCUMENTS

| JP | 3149520 | 6/1991 |
| JP | 08-330375 | 12/1996 |
| JP | 09-159998 | 6/1997 |

* cited by examiner

*Primary Examiner*—Lun-Yi Lao
(74) *Attorney, Agent, or Firm*—David G. Conlin; Peter J. Manus; Dike, Bronstein Roberts & Cushman, Intellectual Property Group of Edwards & Angell, LLP

(57) ABSTRACT

A method is provided for driving an active matrix substrate including a plurality of signal lines provided on an insulator substrate along a first direction, a plurality of scanning lines provided along a second direction to intersect the plurality of signal lines, a plurality of pixel electrodes provided at the intersections of the plurality of signal lines and the plurality of scanning lines, and a plurality of common electrodes provided to form a storage capacitor between each common electrode and the corresponding pixel electrode, a semiconductor layer being provided between each common electrode and the corresponding pixel electrode. The method includes the step of applying a signal to each common electrode such that the depletion layer formed in the semiconductor layer has the maximum width.

4 Claims, 10 Drawing Sheets

METHOD FOR DRIVING ACTIVE MATRIX SUBSTRATE AND LIQUID CRYSTAL DISPLAY DEVICE USING THE SAME

BACKGROUND OF THE INVENTION

1. Field of the Invention:

The present invention relates to a method for driving an active matrix substrate for use in a liquid crystal display device. The present invention also relates to a liquid crystal display device to which the method is applied.

2. Description of the Related Art:

An active matrix type liquid crystal display device typically includes two substrates. On one of the two substrates a counter electrode is provided, while on the other substrate, a plurality of pixel electrodes are arranged. These substrates are attached together in such a way as to face each other while sandwiching a liquid crystal layer. The liquid crystal display device selectively drives the pixel electrodes for displaying.

The substrate on which the pixel electrodes are provided is here referred to as an active matrix substrate. FIG. 7 shows a plan view of the active matrix substrate. In FIG. 7, a plurality of signal lines 101 intersect a plurality of scanning lines 102 (here they are orthogonally crossed). A single switching element 103 is provided at each intersection. The switching element 103 is a thin film transistor (TFT). A scanning line 102 is connected to the gate of each switching element 103, and a signal line 101 is connected to the source of each switching element 103. A pixel capacitor 104 and an storage capacitor 105 are provided for each switching element 103, both being connected to the drain of the switching element 103. A common signal line 106 is provided parallel to each scanning line 102. A terminal 101a is provided at an end of each signal line 101 and a terminal 102a is provided at an end of each scanning line 102.

A pixel capacitor 104 is formed between a pixel electrode provided on the active matrix substrate and the counter electrode provided on the other substrate facing the active matrix substrate. An storage capacitor 105 is formed between each pixel electrode and a common signal line 106.

In such an active matrix substrate, the scanning lines 102 are sequentially scanned. The switching elements 103 connected to each scanning line 102 are switched ON when it is being scanned. A signal voltage is applied via a signal line 101 to the ON-switched switching element 103. The signal voltage is in turn applied via the ON-switched switching element 103 to a pixel electrode. All the scanning lines 102 are scanned while the corresponding signal voltage is applied to each of the pixel electrodes, resulting in displaying an image.

FIG. 8 is a cross-sectional, partially enlarged, view of the active matrix substrate. In FIG. 8, a gate electrode 103a of the switching element 103 (TFT) and the common signal line 106 are formed on a transparent insulative substrate 111. A gate insulator film 112 is provided to cover the gate electrode 103a and the common signal line 106 as well as the substrate 111. A semiconductor layer 113, a source electrode 114, a drain electrode 115, a signal line 101, and a draw line 107 (conductive layer) are successively formed on the gate insulator film 112. This multi-layer structure is covered with an interlayer insulator film 117. Subsequently, a contact hole 117a is formed in the interlayer insulator film 117, and a pixel electrode 118 is then provided on the interlayer insulator film 117 and the contact hole 117a in such a way as to contact the draw line 107.

FIG. 9 roughly shows a fabrication process of the above-described active matrix substrate. Firstly, a semiconductor layer is formed on the transparent insulative substrate 111, and is then patterned to form the scanning line 102 (see FIG. 1), the gate electrode 103a, the common signal line 106 (step 201). An insulator film, an amorphous-silicon layer and an n$^+$-Si layer are successively disposed to cover the gate electrode 103a and the common signal line 106 as well as the substrate 111. The amorphous-silicon layer and the n$^+$-Si layer are subjected to patterning to form the semiconductor layer 113, the source electrode 114 and the drain electrode 115 (step 202). The insulator film is then subjected to patterning to form the gate insulator film 112 (step 203). This patterning results in a contact region 112a formed in the gate insulator film 112 which is used to connect the terminal 101a of the signal line 101 and the terminal 102a of the scanning line 102 (shown in FIG. 7) to the outside. The resultant multi-layer structure is then covered with a conductive layer. The conductive layer is subjected to patterning to form the signal line 101, the draw line 107. This patterning removes a portion of the n$^+$-Si layer between the source electrode 114 and the drain electrode 115, so that both the electrodes are separated from each other (step 204). The interlayer insulator film 117 with the contact hole 117a is disposed on the resulting multi-layer structure (step 205). Finally, a conductive layer is formed on the interlayer insulator film 117 and is then subjected to patterning, resulting in the pixel electrode 118 (step 206).

To reduce the number of photomasks used in the above-described fabrication process, step 202 and step 203 may be integrated into a single step, i.e., the source electrode 114, the drain electrode 115, and the gate insulator film 112 are simultaneously subjected to patterning.

When step 202 and step 203 are performed by one step, the semiconductor layer is inevitably disposed on the gate insulator film 112, so that the gate insulator film 112, the semiconductor layer, and the draw line 107 are successively formed on the common signal line 106. This multi-layer structure is a metal-insulator-semiconductor (MIS) structure, which creates a storage capacitor between the common signal line 106 and the pixel electrode 118. The MIS structure has capacitance-voltage characteristics in which the capacitance of the MIS structure varies depending on voltage applied to the pixel electrode 118. The change in the capacitance affects the voltage applied to the pixel electrode 118 due to the relationship Q=CV, causing the gray level of the pixel to deviate from an intended level.

FIG. 10 is a graph showing a signal voltage Vs for a single signal line 101, a scanning voltage Vg for a single scanning line 102, a voltage Vp for a single pixel electrode 118 and a voltage Vc for the common signal line 106. When the scanning voltage Vg is at a high level, the pixel electrode 118 is connected via the switching element 103 to the signal line 101. In this case, the signal voltage Vs is applied to the pixel electrode 118 the voltage of which is in turn set to Vp. The voltage Vp of the pixel electrode 118 is slightly lowered as compared with the signal voltage Vs due to the TFT of the switching element 103. The potential of the common signal line 106 is set to the same level as that of the counter electrode potential. The voltage Vc of the common signal line 106 agrees with the average value of the voltage Vp of the pixel electrode 118.

Here, the amplitude of the signal voltage Vs has a range having its center around 0 V. The voltage between the common signal line 106 and the pixel electrode 108 varies, which leads to variation of the capacitance of the MIS structure and thus the capacitance of the storage capacitor between the common signal line 106 and the pixel electrode 118. For this reason, the voltage Vp of the pixel electrode 118 deviates from an intended value, thereby causing the gray scale of the pixel to be unstable.

To prevent the variation of the capacitance of the storage capacitor caused by the voltage applied to the pixel electrode, Japanese Patent Publication No. 2856789 discloses a method for driving a display device in which a voltage is applied to the common signal line in such a way as to hold the capacitor of the MIS structure, which is included in the storage capacitor structure, within a maximum region of its capacitance-voltage characteristics. However, this driving method must keep the potential of the common signal "positive" constantly relative to the potential of the pixel electrode. Then, the semiconductor layer in the MIS structure is constantly in the inversion state. In this case, the threshold voltage of the MIS structure varies greatly as compared with when the potential of the common signal is set to "negative" relative to the potential of the pixel electrode. In particular, when an MIS structure is irradiated by a backlight as in a transmission type liquid crystal display device, the threshold voltage of the MIS structure varies greatly, and after long-time operation, the transitive capacitance region of the capacitance-voltage characteristics of the storage capacitor is shifted to the "negative" side. As a result, the potential of the pixel electrode becomes unstable. This leads to unstable gray scale display and further poor image quality such as flicker and burn-in.

For a large-size or high-precision liquid crystal display device, an increased number of signal lines, scanning lines, common signal lines and the like are necessary, i.e., the load of wiring increases, which requires the ability of its driving circuit to supply more current. To this end, the size of the driving circuit and/or the number of the driving circuits need to be increased. This leads to an increase in the cost. To address this problem, the wiring load as well as the parasitic capacitance of the wiring should be reduced. In particular, the parasitic capacitance, which occurs at the intersections between the wirings such as the signal line, the scanning line, and the common line, is very great. There has been an conventional attempt to reduce the area of the intersection in order to reduce such parasitic capacitance.

SUMMARY OF THE INVENTION

According to one aspect of the present invention, a method is provided for driving an active matrix substrate including a plurality of signal lines provided on an insulator substrate along a first direction, a plurality of scanning lines provided along a second direction to intersect the plurality of signal lines, a plurality of pixel electrodes provided at the intersections of the plurality of signal lines and the plurality of scanning lines, and a plurality of common electrodes provided to form a storage capacitor between each common electrode and the corresponding pixel electrode, a semiconductor layer being provided between each common electrode and the corresponding pixel electrode. The method includes the step of applying a signal to each common electrode such that the depletion layer formed in the semiconductor layer has the maximum width.

In one embodiment of this invention, a common signal line for supplying a signal to the common electrode is provided along the second direction, and the semiconductor layer exists in the intersection of the common signal line and the signal line.

In one embodiment of this invention, the following expression is satisfied:

$$Vc \leq -Vpmax - Vdmax$$

where Vc is a signal voltage applied to the common electrode; −Vpmax is the negative maximum voltage applied to the pixel electrode; and Vdmax is a voltage applied to the semiconductor layer when the depletion layer of the semiconductor layer has the maximum width.

According to another aspect of this invention, a liquid crystal display device includes an active matrix substrate; a counter substrate including a counter electrode; and a liquid crystal layer sandwiched by the active matrix substrate and the counter substrate. The active matrix substrate includes a plurality of signal lines provided on an insulator substrate along a first direction: a plurality of scanning lines provided along a second direction to intersect the plurality of signal lines; a plurality of pixel electrodes provided at the intersections of the plurality of signal lines and the plurality of scanning lines: and a plurality of common electrodes provided to form a storage capacitor between each common electrode and the corresponding pixel electrode, a semiconductor layer being provided between each common electrode and the corresponding pixel electrode. A signal is applied to the common electrode such that the depletion layer formed in the semiconductor layer has the maximum width.

According to the method for driving the active matrix substrate of this invention, a signal applied to the common electrode is set to a value such that the depletion layer of the semiconductor layer between the pixel electrode and the common electrode has its maximum width. When the depletion layer width of the semiconductor layer is constantly held maximum, the capacitance between the pixel electrode and the common electrode does not vary even when the voltage of the pixel electrode varies. Therefore, the voltage of the pixel electrode can be set to an intended value, i.e., the gray scale of the pixel is stable.

In this invention, the depletion layer width of the semiconductor layer is maximum and the capacitance of the storage capacitor is minimum. This can reduce variation of the threshold voltage to a lower level than when the capacitance of the storage capacitor is stabilized at the maximum value as disclosed in Japanese Patent Publication No. 2856789. In the transmission type liquid crystal display device, the potential of the pixel electrode can be set to an intended value, i.e., stable gray scale display can be realized. Furthermore, there is no poor image quality such as flicker and burn-in.

The main factor in the flicker is the DC component $\Delta Vp$, which is represented by the following expression: $\Delta Vp = \{Cgd/(Clc+Ccs+Cgd)\} \times V(gp-p)$, where Cgd is the parasitic capacitance between the gate and the drain; Clc is the capacitance between the pixel electrode and the counter electrode which sandwich the liquid crystal layer; Ccs is the capacitance of the storage capacitor; and V(gp−p) is the voltage difference between the peaks of the gate driving signal. As is apparent from the expression, the greater the value of the capacitance of the storage capacitor is, the smaller $\Delta Vp$ is. Even when the capacitance of the storage capacitor is minimum, a sufficiently large area of the storage capacitor can reduce $\Delta Vp$ to a satisfactory level, thereby preventing poor image quality.

Further, in this invention, the common signal potential is negative relative to the potential of the pixel electrode. In this case, holes collect at the interface between the semiconductor layer and the insulator film, as in an MIS structure in which the gate metal thereof is negative. As opposed to this, when the common signal potential is positive relative to the potential of the pixel electrode, electrons collect at the interface between the semiconductor layer and the insulator film. Here, the hole is the absence of an electron. The electron is free and has great energy, and it is easily trapped at a capture energy level. When free electrons are trapped in the insulator film, an internal electric field occurs, so that the threshold voltage of the MIS diode is shifted to the positive side. The trapping depends on whether carriers accumulated at the interface are holes or electrons. The positive common signal potential relative to the pixel electrode is therefore advantageous to the threshold voltage shift.

This invention can be applied to an active matrix substrate in which the common signal line is provided parallel to the scanning line and a semiconductor layer exists at the intersection of the common signal line and the signal line.

As described above, when step 202 and step 203 shown in FIG. 9 are integrated into one step, a semiconductor layer is inevitably provided on the gate insulator film. Accordingly, the MIS structure of the common signal line, the insulator film, and the semiconductor layer is formed at the intersection of the common signal line and the signal line. When a signal applied to the common signal line is set to a value such that the depletion layer of the semiconductor layer has its maximum width, the capacitance of the intersection can be reduced, thereby contributing to cost reduction of large-size and high-precision liquid crystal display devices.

In one embodiment of this invention, the voltage Vc applied to the common electrode is set to a value satisfying the following expression:

$$Vc = -Vpmax - Vdmax \qquad (1)$$

where $-Vpmax$ is the negative maximum voltage applied to the pixel electrode and Vdmax is a voltage applied to the semiconductor layer when the depletion layer of the semiconductor layer has its maximum width. When the DC voltage Vc satisfying the above expression (1) is applied to the common electrode, a voltage having a value of Vdmax or more is constantly applied to the semiconductor layer no matter how the voltage of the pixel electrode varies. Therefore, the depletion layer width of the semiconductor layer is constantly held maximum.

The method for driving an active matrix substrate according to this invention can be applied to a liquid crystal display device including the above-described active matrix substrate, a counter substrate on which a counter electrode is provided, and a liquid crystal layer sandwiched by both the substrates.

Thus, the invention described herein makes possible the advantages of (1) providing a method for driving an active matrix substrate, the method being capable of reducing parasitic capacitance existing at the intersections of signal lines, scanning lines and common signal lines; and (2) providing a liquid crystal display device using the method.

These and other advantages of the present invention will become apparent to those skilled in the art upon reading and understanding the following detailed description with reference to the accompanying figures.

DESCRIPTION OF THE PREFERRED EMBODIMENTS

Examples of the present invention will be described below with reference to the accompanying drawings.

Figure 1:
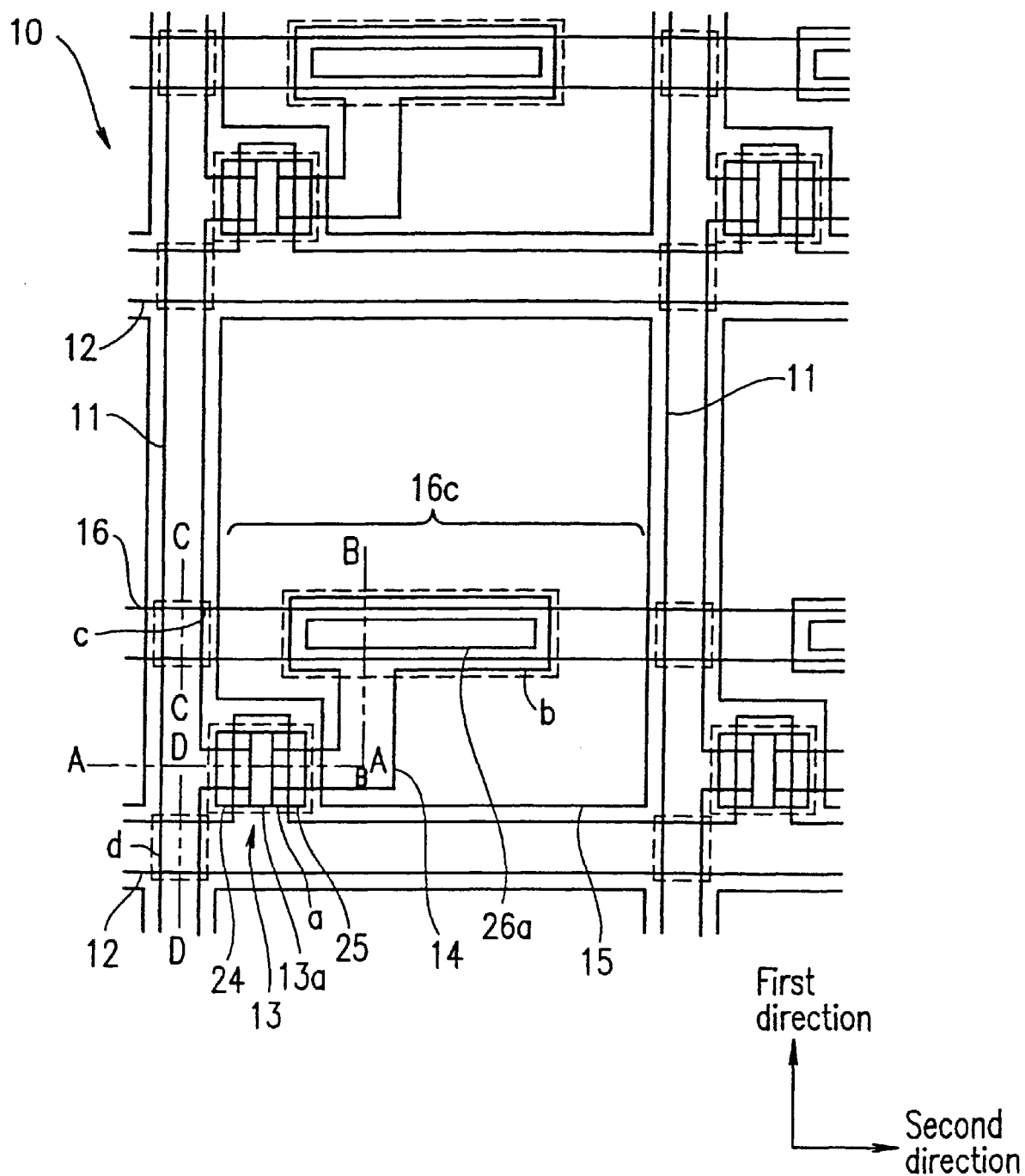
FIG. 1 is a plan view of an active matrix substrate to which a driving method according to an example of the present invention is applied.

FIG. 1 is a plan view of an active matrix substrate to which a driving method according to an example of the present invention is applied. In an active matrix substrate 10, a switching element (TFT) 13 is disposed at the intersection of a signal line 11 and a scanning line 12 as shown in FIG. 1. A draw line 14 is connected to the drain of the switching element 13. The draw line 14 is also connected to a pixel electrode 15. A common signal line 16 is disposed parallel to the scanning line 12. A common electrode 16a is a portion of the common signal line 16 which lies under the pixel electrode 15.

Figure 2A:
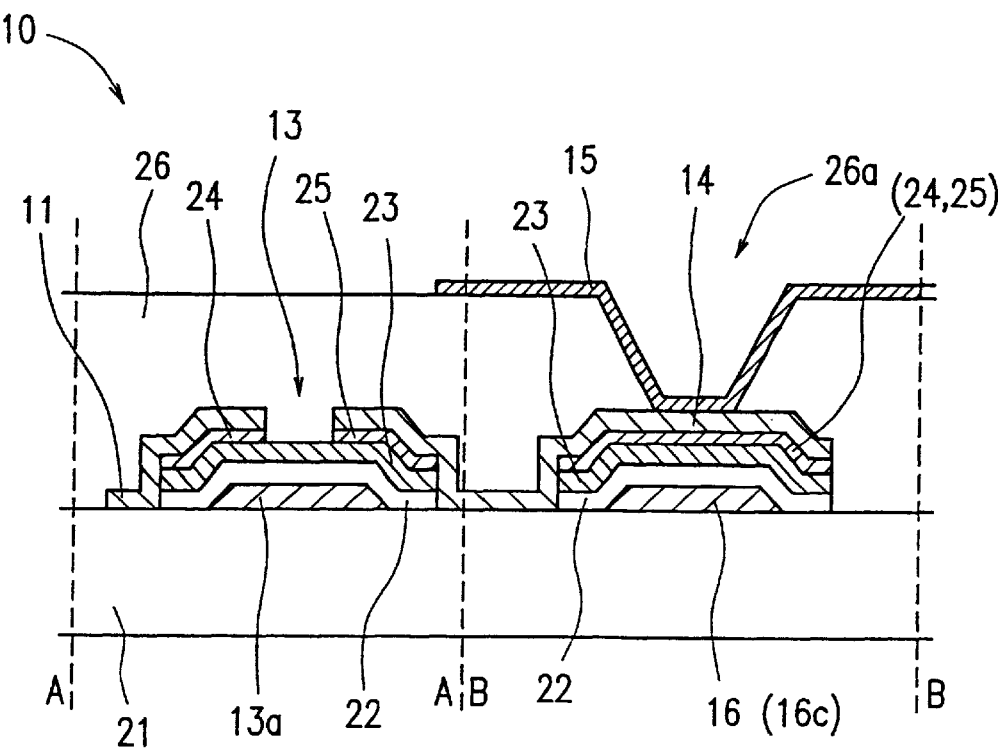
FIG. 2A in a cross-sectional view of the active matrix substrate shown in FIG. 1 taken along lines A—A and B—B.
Figure 2B:
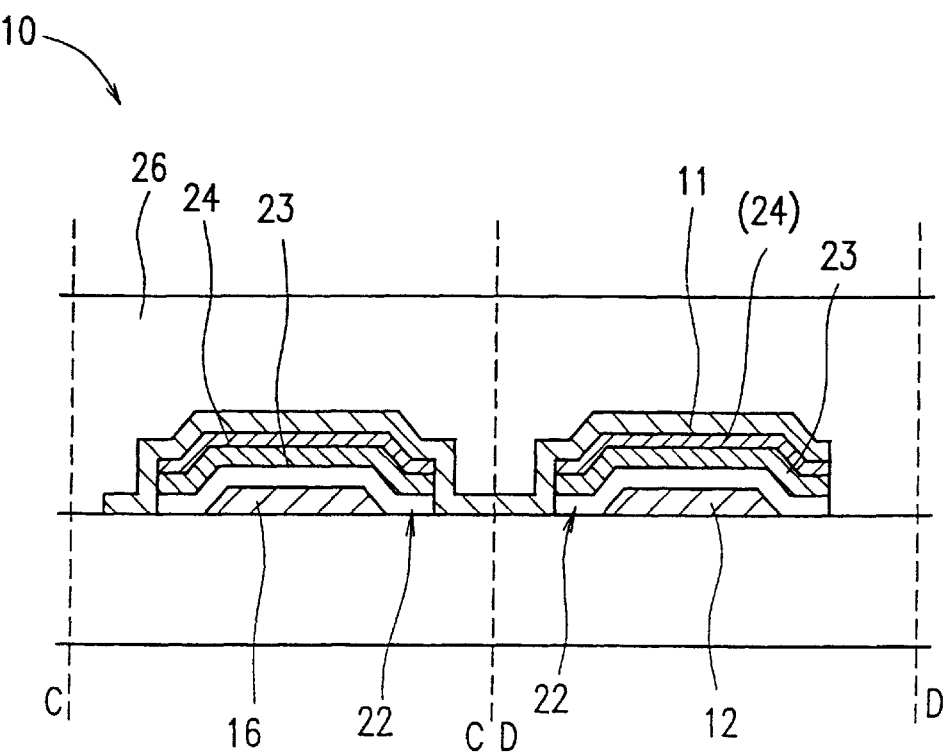
FIG. 2B is a cross-sectional view of the active matrix substrate shown in FIG. 1 taken along lines C—C and D—D.

FIGS. 2A and 2B are cross-sectional views of the active matrix substrate 10. The left half of FIG. 2A shows a portion a marked by a dotted line of the substrate 10, taken along a line A—A. The right half of FIG. 2A shows a portion b marked by a dotted line of the substrate 10, taken along a line B—B. The left half of FIG. 2B shows a portion a marked by a dotted line of the substrate 10, taken along a line C—C. The right half of FIG. 2B shows a portion d marked by a dotted line of the substrate 10, taken along a line D—D. As shown in FIG. 2A, in the active matrix substrate, the gate electrode 13a of the switching element 13 and the common signal line 16 are formed on a transparent insulative substrate 21. A gate insulator film 22, a semiconductor layer 23, a source electrode 24, a drain electrode 25, the signal line 11 and the draw line 14 are further formed over the substrate 21. An interlayer insulator film 26 is formed on the resulting multi-layer structure. A contact hole 26a is provided in the interlayer insulator film 26 and the pixel electrode 15 is then formed on the contact hole 26a and the interlayer insulator film 26. The pixel electrode 15 is connected via the contact hole 26a to the draw line 14.

An storage capacitor structure is formed between the pixel electrode 15 and the common electrode 16c. The storage capacitor includes the 3-layer structure including the common signal line 16, the gate insulator film 22 and the semiconductor layer 23 which constitute an MIS structure as described above. As shown in FIG. 2B, the intersection of the scanning line 12 and the signal line 11 as well as the intersection of the common signal line 16 and the signal line 11 have the same MIS structure as that shown in the left half of FIG. 2A.

Figure 3:
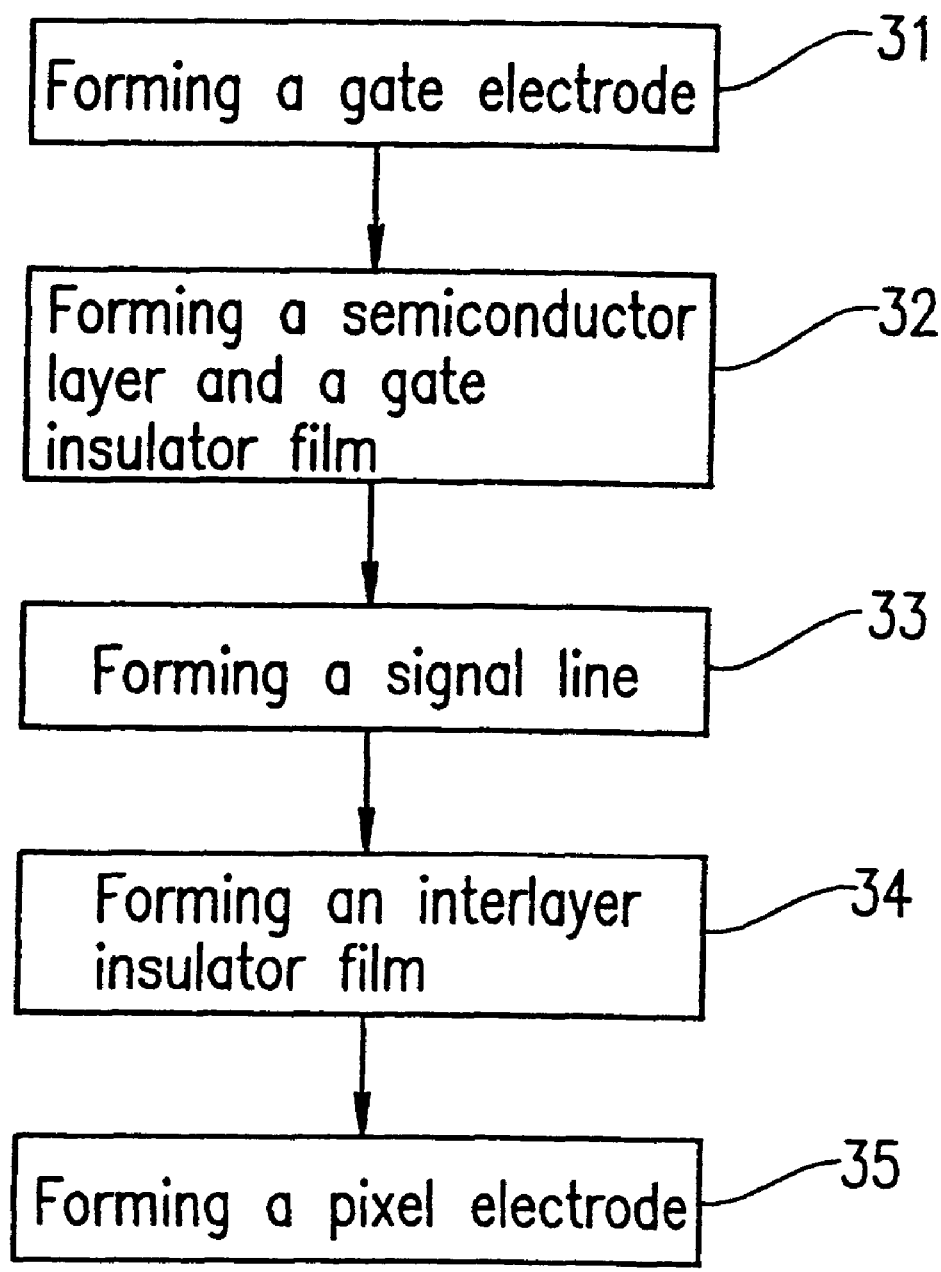
FIG. 3 is a flow chart roughly showing a fabrication process of the active matrix substrate shown in FIG. 1.

FIG. 3 roughly shows a fabrication process of the active matrix substrate 10. Firstly, a semiconductor layer is formed on the transparent insulative substrate 21, and is then patterned to form the scanning line 12, the gate electrode 13a, the common signal line 16 (step 31). An insulator film, an amorphous-silicon layer and a n+-Si layer are successively disposed over the substrate 21. The amorphous-silicon layer and the n+-Si layer are simultaneously subjected to patterning to form the gate insulator film 22, the semiconductor layer 23, the source electrode 24, the drain electrode 25 and a conductive portion (24,25) (step 32). The resultant multi-layer structure is then covered with a conductive layer. The conductive layer is subjected to patterning to form the signal line 11, the draw line 14. This patterning removes a portion of the n+-Si layer between the source electrode 24 and the drain electrode 25, so that both the electrodes are separated from each other (step 33). The interlayer insulator film 26 is disposed on the resulting multi-layer structure (step 34). Finally, a conductive layer is formed on the interlayer insulator film 26 and is then subjected to patterning, resulting in the pixel electrode 15 (step 35).

Figure 9:
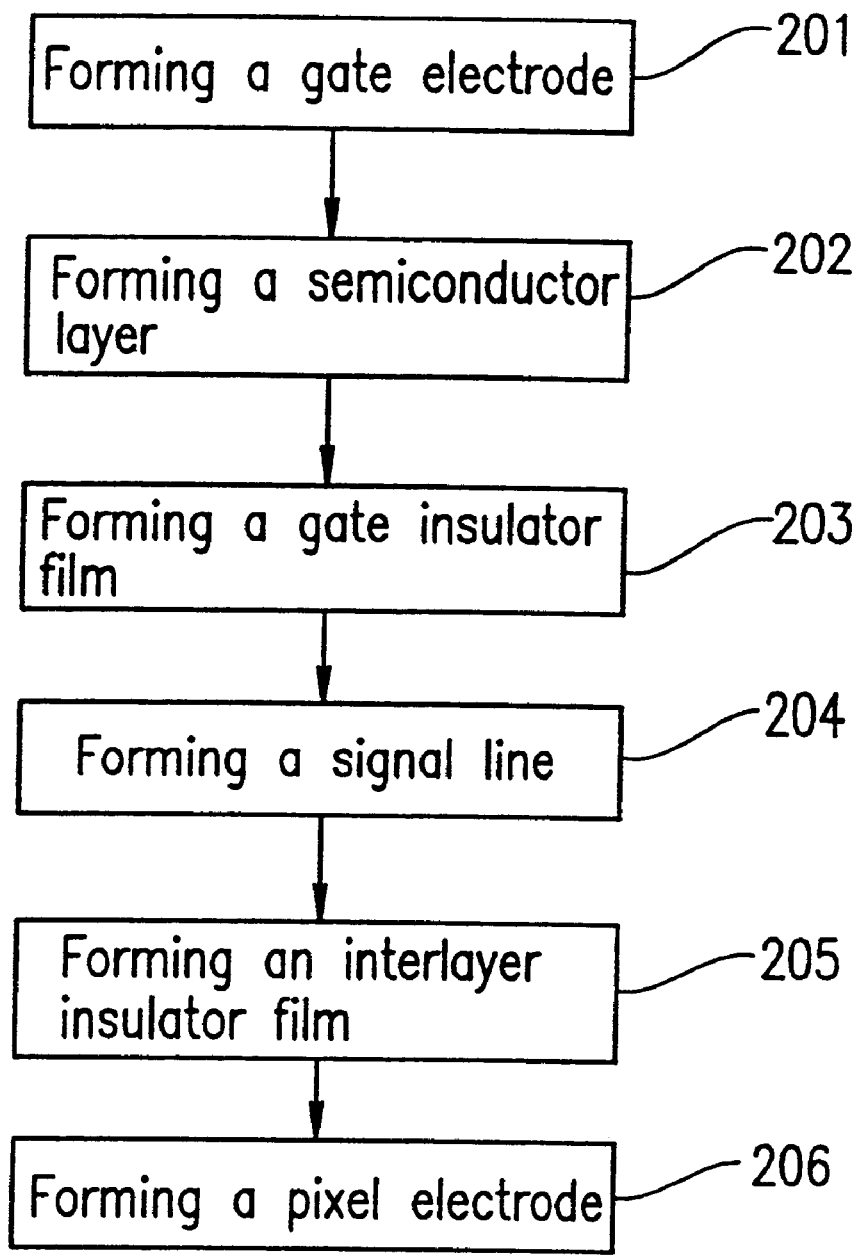
FIG. 9 is a flow chart roughly showing a fabrication process of the active matrix substrate shown in FIG. 8.
Figure 10:
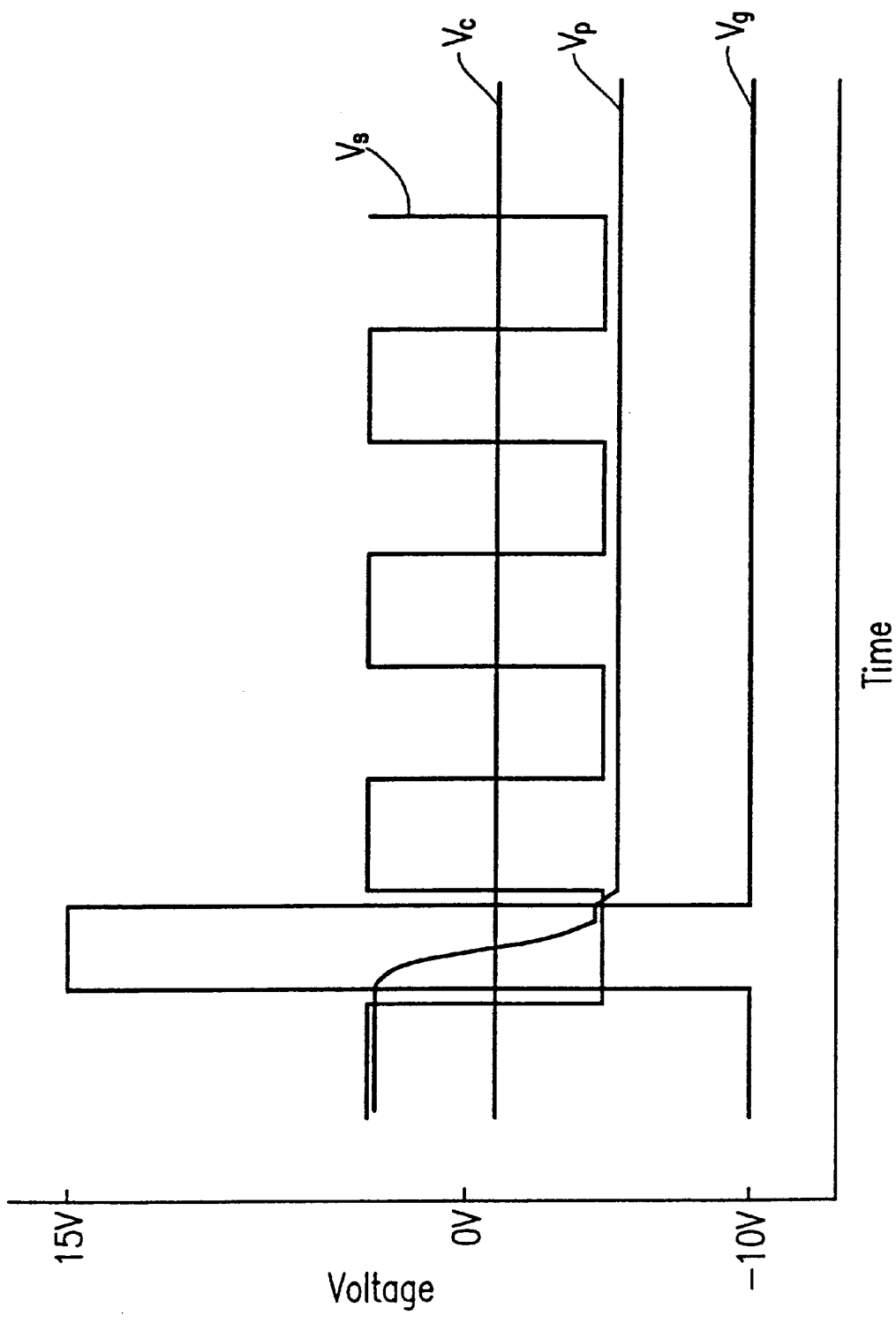
FIG. 10 is a graph illustrating signals used in the active matrix substrate shown in FIG. 8.

In the fabrication process of FIG. 3, step 32 corresponds to a step including step 202 and step 203 of the conventional fabrication process shown in FIG. 9; and because of step 32, the photomask used to form the gate insulator film 112 in the conventional fabrication process is omitted. The fabrication process of the active matrix substrate according to this example is simplified as compared with the conventional one. This leads to a reduction in the cost of a liquid crystal display device.

Figure 4:
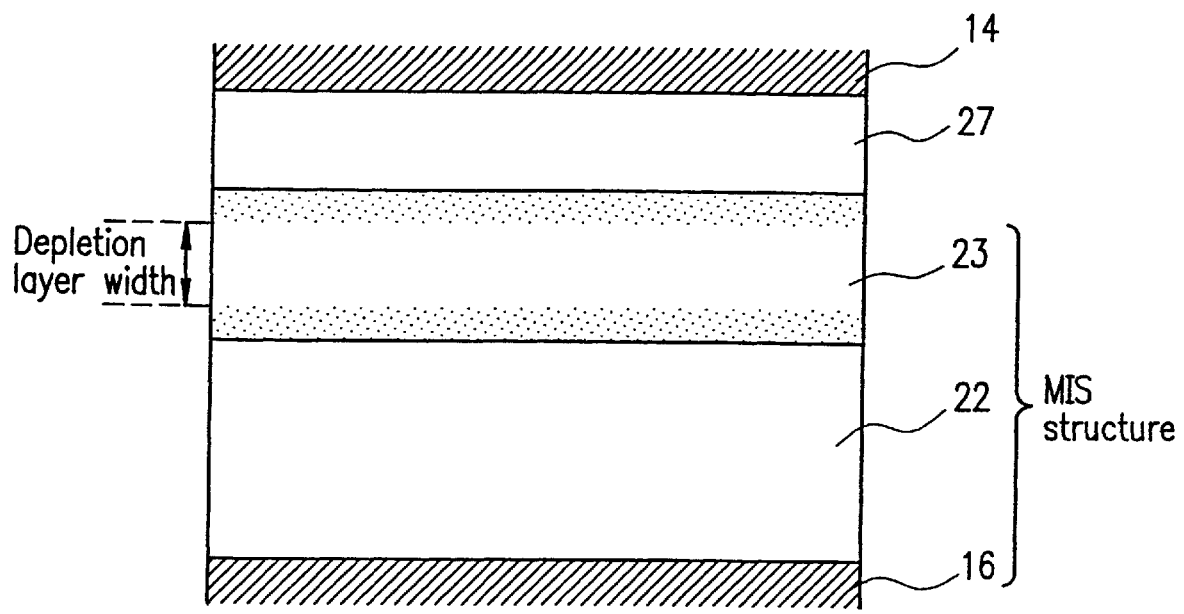
FIG. 4 is a cross-sectional view showing an MIS structure included in an storage capacitor structure of the active matrix substrate shown in FIG. 1.

The active matrix substrate 10 includes the above described MIS structure between the common signal line 16 and the pixel electrode 15 which is included in the storage capacitor structure. FIG. 4 is a partially enlarged view of the MIS structure shown in the right half of FIG. 2A. The MIS structure has C-V characteristics as described above. The capacitance of the MIS structure varies depending on a voltage applied to the pixel electrode 15, i.e., the capacitance of the storage capacitor varies, which leads to an unintended voltage of the pixel electrode 15 which in turn causes the pixel gray scale to be unstable.

To address the above-described drawback, the method for the active matrix substrate according to the present invention stabilizes the capacitance of the MIS structure by setting the DC voltage Vc of the common signal line 16 to a value which satisfies the following expression:

$$Vc \leq -Vpmax - Vdmax \qquad (1)$$

where $-Vpmax$ is the negative maximum voltage applied to the pixel electrode 15 and Vdmax is a voltage applied to the semiconductor layer 23 when the depletion layer of the semiconductor layer 23 between the common signal line 16 and the pixel electrode 15 has its maximum width.

The C-V characteristics of the MIS structure depends on the width of the depletion of the semiconductor layer 23. As a voltage applied across the semiconductor layer 23 varies, the width of the depletion layer varies, resulting in variation of the capacitance of the MIS structure. Conversely, by holding the width of the depletion layer constant, the capacitance of the MIS structure does not vary and the capacitance of the storage capacitor between the common signal line 16 and the pixel electrode 15 does not vary. In this example, in order to hold the width of the depletion layer maximum, the DC voltage Vc of the common signal line 16 is set to a value defined by the expression (1). Therefore, even when the signal voltage Vs applied to the pixel electrode 15 varies, the capacitance of the MIS structure remains constant, i.e., the capacitance of the storage capacitor between the common signal line 16 and the pixel electrode 15 dose not change.

Figure 5:
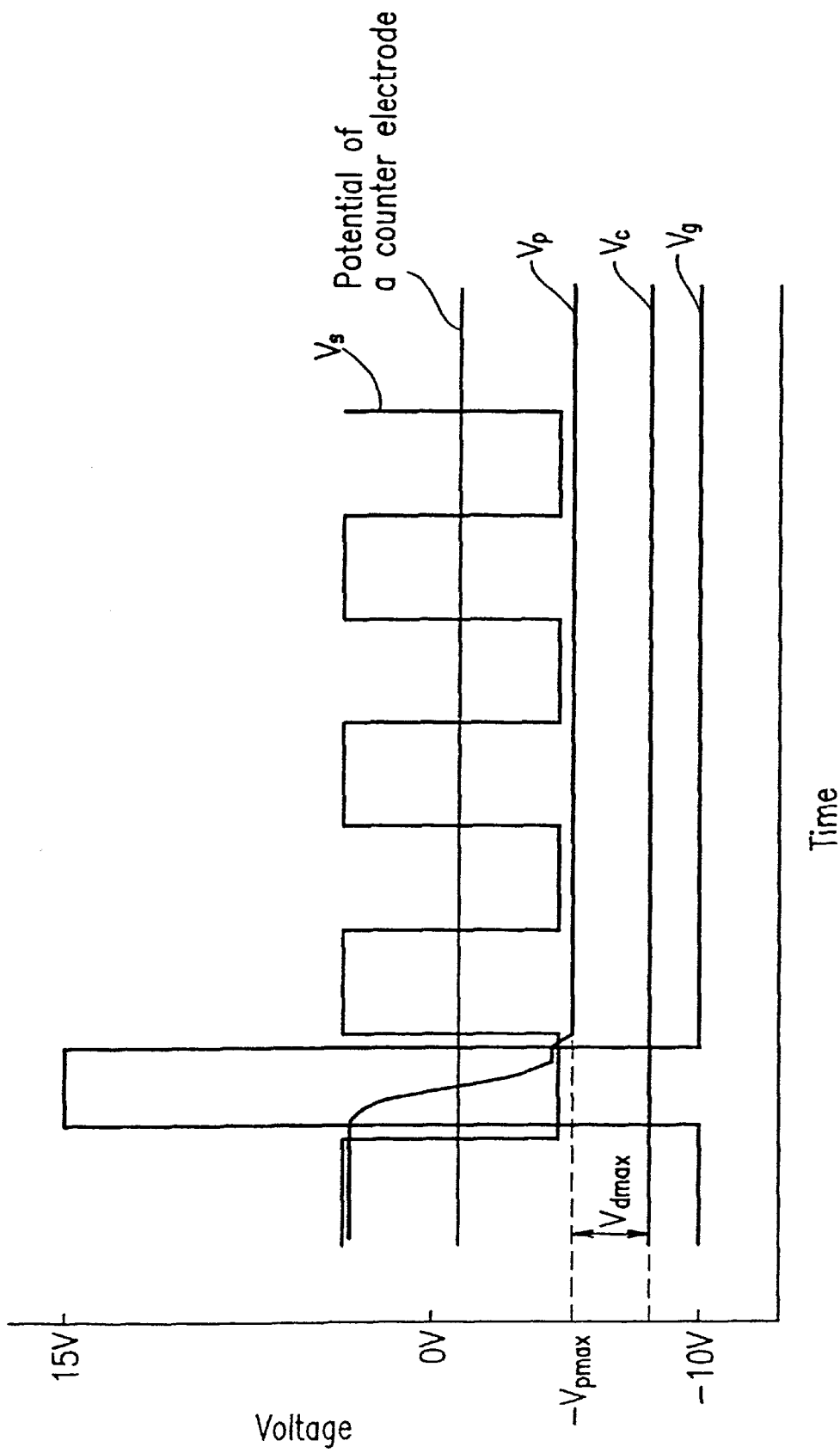
FIG. 5 is a graph illustrating signals used in driving the active matrix substrate shown in FIG. 1.

FIG. 5 is a graph showing a signal voltage Vs for a single signal line 11, a scanning voltage Vg for a single scanning line 12, a voltage Vp for a single pixel electrode 15 and a voltage Vc for the common signal line 16. When the scanning voltage Vg is at a high level, the pixel electrode 15 is connected via the switching element 13 to the signal line 11. In this case, the signal voltage Vs is applied to the pixel electrode 15 the voltage of which is in turn set to Vp. The voltage Vp of the pixel electrode 15 is lowered as compared with the signal voltage Vs due to the TFT of the switching element 13. The DC voltage of the common signal line 16 is se t to a value defined by the expression (1).

In the driving method of this example, the DC voltage Vc of the common signal line 16 is set to a value defined by the expression (1), so that a voltage between the common signal line 16 and the pixel electrode 15 is held Vdmax or more as long as the signal voltage Vs is with in a normal voltage range. Thus, the depletion layer of the semiconductor layer 23 constantly keeps its maximum width, so that the capacitance of the MIS structure does not change, i.e., the capacitance of the storage capacitor between the common signal line 16 and the pixel electrode 15 does not change, thereby obtaining stable gray scale of the pixel.

Figure 6:
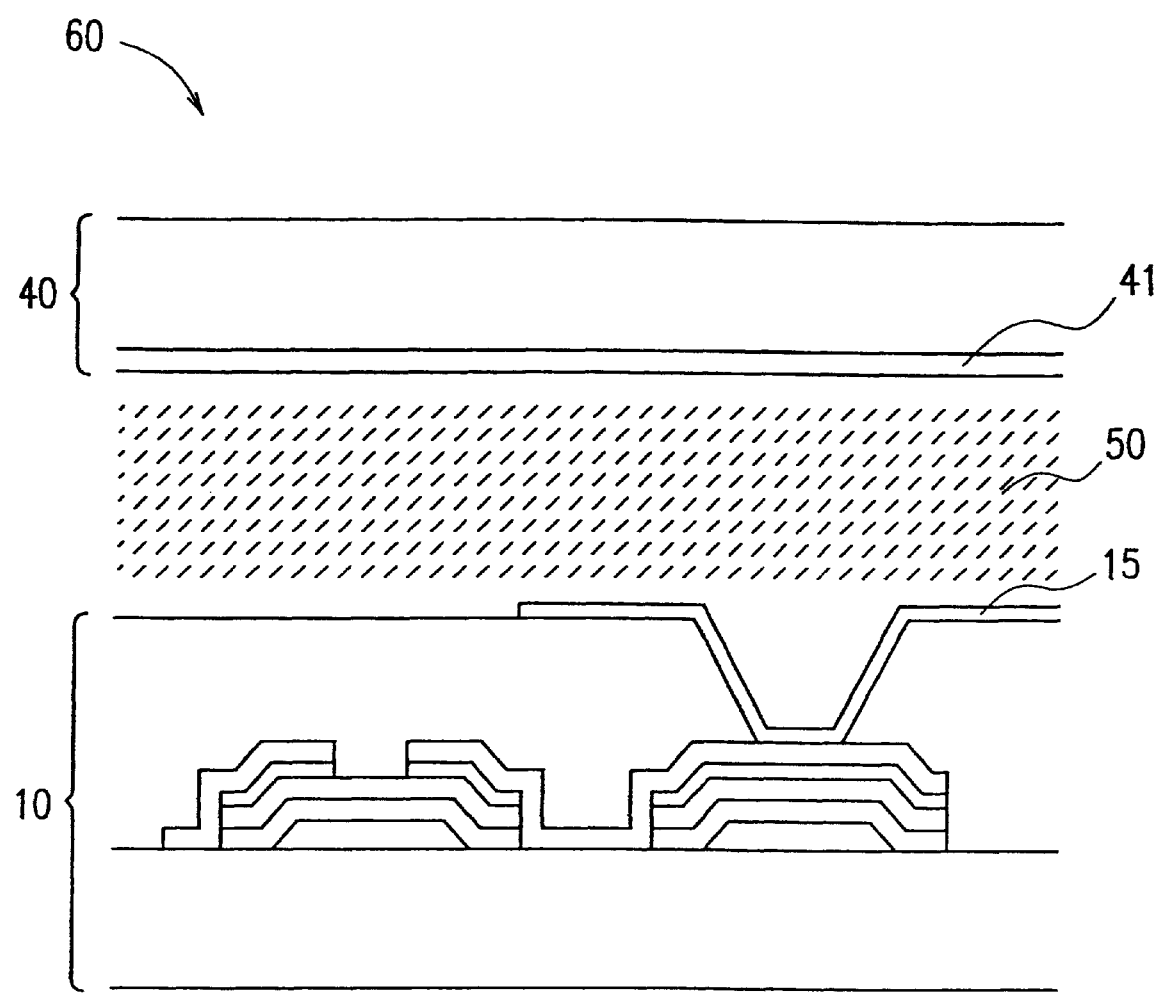
FIG. 6 is a cross-sectional view of a part of a liquid crystal display device including the active matrix substrate shown in FIG. 1.
Figure 7:
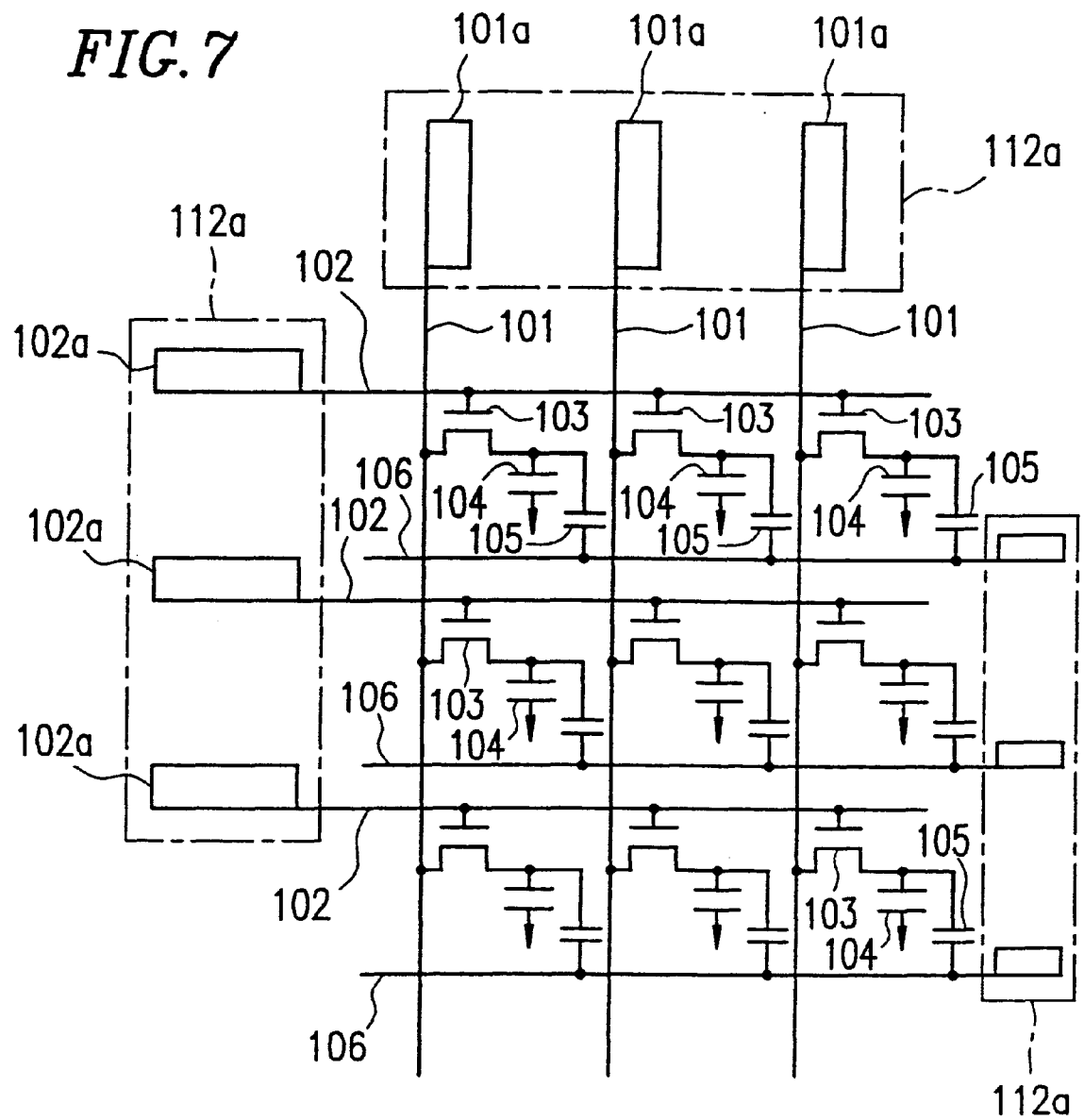
FIG. 7 is an overview of a structure of an active matrix substrate.
Figure 8:
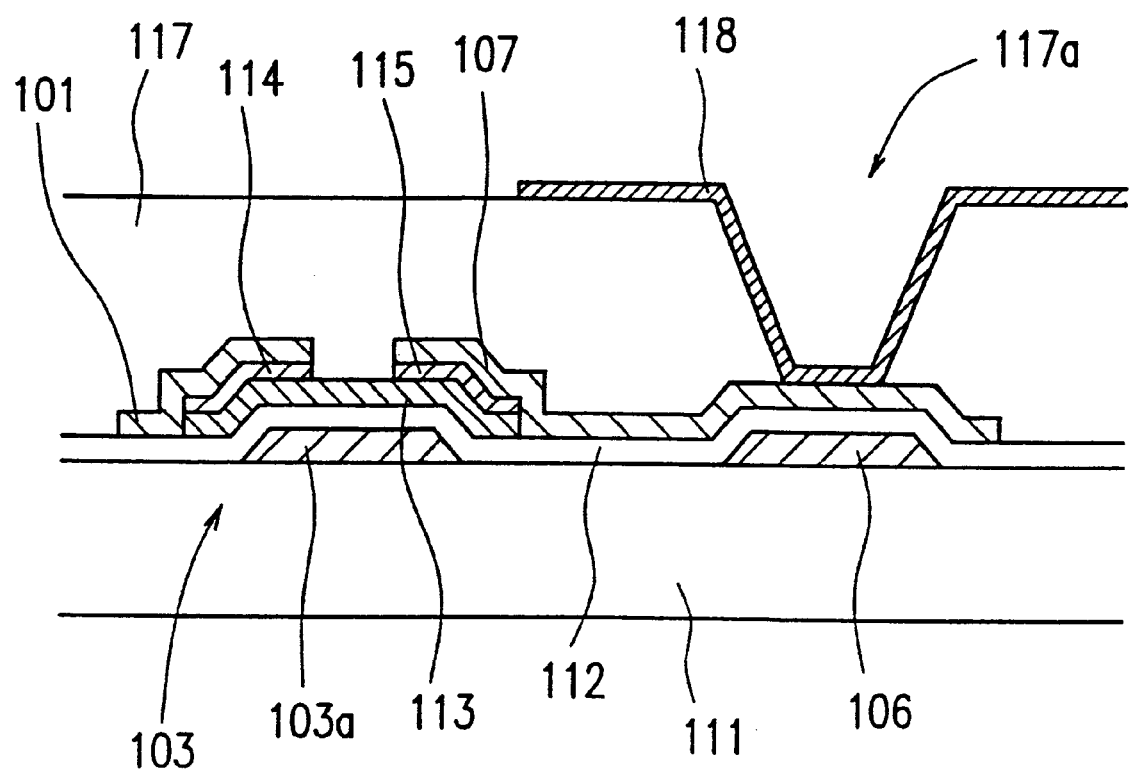
FIG. 8 is a cross-sectional view of a conventional active matrix substrate.

FIG. 6 is a cross-sectional view of a part of a liquid crystal display device to which an active matrix substrate 10 which is driven by a method of this example is applied.

As shown in FIG. 6, the liquid crystal display device 60 includes a counter substrate 40 and an active matrix substrate 10 which face each other. A counter electrode 41 is provided on the counter substrate 40. Alignment layers (not shown) are formed on surfaces of the counter substrate 40 and the active matrix substrate 10. The substrates 10 and 40 sandwich a liquid crystal layer 50. Pixel capacitance emerges between a pixel electrode 15 and the counter electrode 41.

Here, as the voltage Vp of the pixel electrode 15 changes, a voltage applied across the liquid crystal layer 50 changes, which leads to a change in the transmission of the layer 50, that is, the gray level of the pixel changes. In the conventional device, when the storage capacitance of the pixel electrode 15 changes in response to a change in the signal voltage Vs, the transmission of the liquid crystal layer 50 also changes, i.e., the gray level of the pixel changes. The gray level change of the pixel due to the capacitance of the storage capacitor change is undesirable, which causes the gray level of the pixel to be shifted from what is intended. This is a critical defect against a display device.

When using the driving method of this example, a change in the signal voltage Vs does not lead to a change in the capacitance of the storage capacitor between the common signal line 16 and the pixel electrode 15. Therefore, the voltage Vp of the pixel electrode 15 can be set to an intended value, i.e., the gray scale of the pixel is stable.

Since the fabrication process of the active matrix substrate 10 to which the driving method of this example is simplified as compared with the conventional one as described above, the cost of the liquid crystal display device 60 can be reduced.

Furthermore, as shown in FIG. 2B, the multi-layer structure of a common signal line, an insulator film, a semiconductor layer and another signal line is formed at the intersection of the common signal line and the other signal line. When using the driving method of this example, the capacitance of the intersection can be reduced by about 30% as compared with when the multi-layer structure of the intersection does not include the semiconductor layer or when it includes it and the common signal potential is positive relative to the pixel electrode potential. Therefore, the area of a driving circuit can be decreased, thereby reducing the cost of a large-size and high-precision liquid crystal display device.

As a result, the gray level is not shifted from what is intended, thereby making it possible to provide a liquid crystal display device with high display quality and low cost.

This invention is not limited to the above-described example. The essence of this invention is that when a liquid crystal display device includes an active matrix substrate which includes an MIS structure between a pixel electrode and a common electrode, the voltage of the common electrode is simply set to a value such that the depletion layer of a semiconductor layer included in the MIS structure has its maximum width. Moreover, a signal applied to the common signal line may be not only a constant voltage but also may be a pulse voltage when the depletion layer width of the semiconductor layer is maximum.

As described above, in the method for driving an active matrix substrate according to the present invention, a signal applied to the common signal is set to a value such that the depletion layer of the semiconductor layer between the pixel electrode and the common electrode has its maximum width. When the depletion layer width of the semiconductor layer is constantly held maximum, the capacitance between the pixel electrode and the common electrode does not vary when the voltage of the pixel electrode varies. Therefore, the voltage of the pixel electrode can be set to an intended value and thus the gray scale of the pixel is stable.

Furthermore, in the method for driving an active matrix substrate according to the present invention, a multi-layer structure including a common signal line, an insulator film, a semiconductor layer and another signal line is formed at the intersection of the common signal line and the other signal line the capacitance of the intersection can be reduced by about 30%. Therefore, this contributes to a reduction in the cost of a large-size and high-precision liquid crystal display device.

Furthermore, in a liquid crystal display device according to the present invention, since it includes the above-described active matrix substrate and it uses a driving method of this invention, the gray level is not shifted from what is intended and the device obtains high display quality and low cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for driving an active matrix substrate including a plurality of signal lines provided on an insulator substrate along a first direction, a plurality of scanning lines provided along a second direction to intersect the plurality of signal lines, a plurality of pixel electrodes provided at the intersections of the plurality of signal lines and the plurality of scanning lines, and a plurality of common electrodes provided to form a storage capacitor between each common electrode and the corresponding pixel electrode, a semiconductor layer being provided between each common electrode and the corresponding pixel electrode, the method comprising the step of:
applying a signal to each common electrode such that the depletion layer formed in the semiconductor layer has the maximum width.

2. A method according to claim 1, wherein a common signal line for supplying a signal to the common electrode is provided along the second direction, and said semiconductor layer exists in the intersection of the common signal line and the signal line.

3. A method for driving an active matrix substrate according to claim 1, wherein the following expression is satisfied:

$$Vc \leq -Vpmax - Vdmax$$

where Vc is a signal voltage applied to the common electrode; −Vpmax is the negative maximum voltage applied to the pixel electrode; and Vdmax is a voltage applied to the semiconductor layer when the depletion layer of the semiconductor layer has the maximum width.

4. A liquid crystal display device comprising:
an active matrix substrate;
a counter substrate including a counter electrode; and
a liquid crystal layer sandwiched by the active matrix substrate and the counter substrate,
the active matrix substrate including:
a plurality of signal lines provided on an insulator substrate along a first direction;
a plurality of scanning lines provided along a second direction to intersect the plurality of signal lines;
plurality of pixel electrodes provided at the intersections of the plurality of signal lines and the plurality of scanning lines; and
a plurality of common electrodes provided to form a storage capacitor between each common electrode and the corresponding pixel electrode, a semiconductor layer being provided between each common electrode and the corresponding pixel electrode,
wherein a signal is applied to the common electrode such that the depletion layer formed in the semiconductor layer has the maximum width.

* * * * *